Feb. 4, 1930.　　　T. F. DUFFEY　　　1,746,108
WIRE SLACK ELIMINATING DEVICE
Filed July 16, 1927
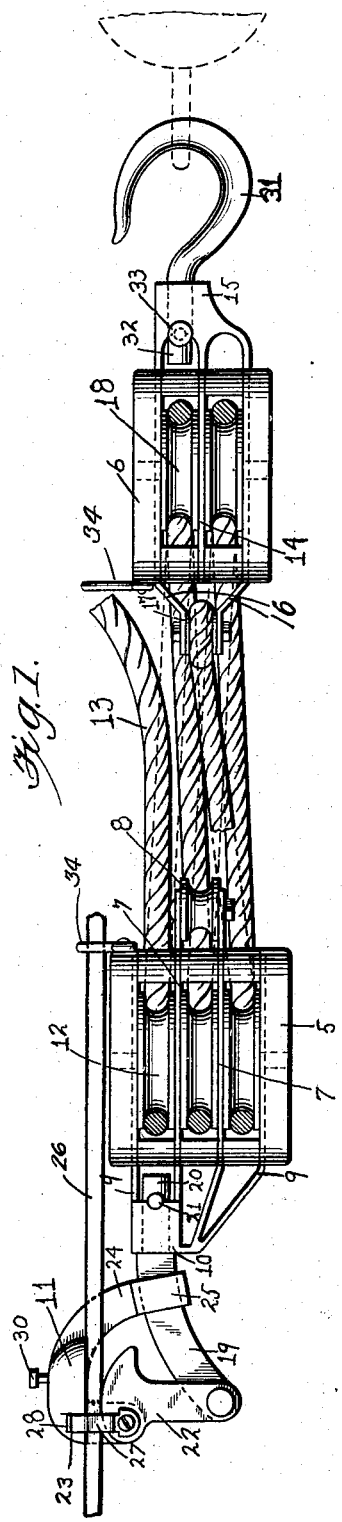
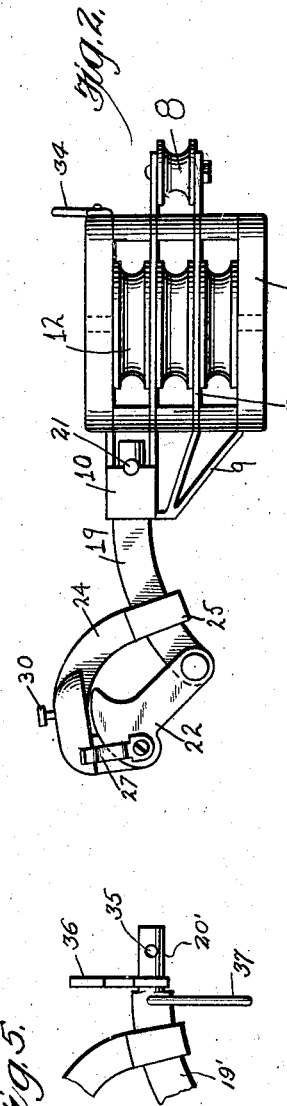
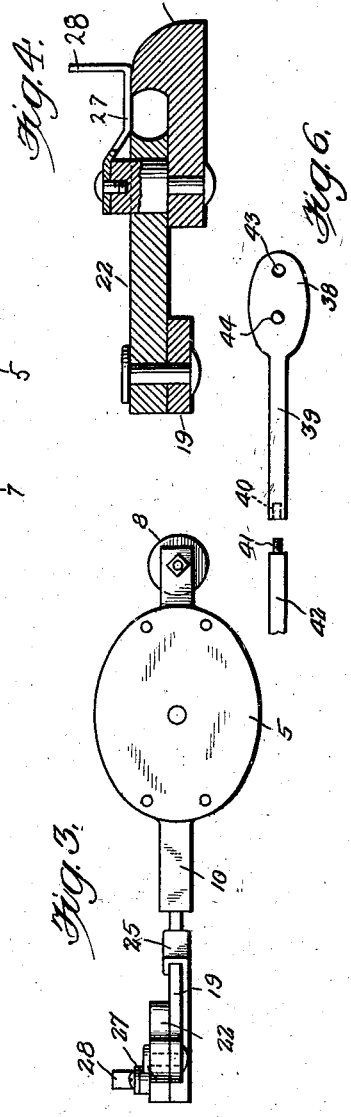
Inventor
Thomas F. Duffey
By Bernard F. Garvey
Attorney Patented Feb. 4, 1930

1,746,108

UNITED STATES PATENT OFFICE

THOMAS FRANCIS DUFFEY, OF SCRANTON, PENNSYLVANIA

WIRE-SLACK-ELIMINATING DEVICE

Application filed July 16, 1927. Serial No. 206,234.

The present invention consists of a wire slack eliminating device which is especially adapted for use by linemen in taking slack out of the line wires preparatory to splicing the ends thereof.

It is well-known in the art to provide clamps which are used by linemen to draw the wires taut, but in using them it is necessary for the linemen to leave the pole and not only expose themselves to the dangers incident to being suspended from the cable wire, but the task is very laborious and tedious, it frequently happening that conditions prevent the lineman from completely relieving the slack condition in the wires. It is consequently an object of this invention to provide a device which may be anchored on and operated from a line pole and engaged with the wire in proximity to the pole, following which the clamp is urged outwardly on the wire to the desired location, after which the clamp is tightened on the wire and the latter drawn taut during which operation the linemen do not have to leave the pole.

Another object of the invention is to provide a wire slack eliminating device which may be engaged with the wire with facility and is equipped with suitable restraining means to prevent the wire from leaving the clamp until after the wire has been drawn to the desired degree of tautness.

A further object of the invention is to provide a wire slack eliminating device in which blocks and tackle are employed and which have engaged therewith a suitable anchor hook and a suitable wire clamp means both of which are rigidly secured to the blocks in order to prevent any play between the hook and clamp and the blocks.

Other objects of the invention will be apparent from the following description of the present preferred forms of the invention, taken in connection with the accompanying drawings, wherein Figure 1 is a side elevational view of a wire slack eliminator constructed in accordance with the present invention, the tackle being shown fragmentarily;

Figure 2 is a side elevational view of the wire clamp and its supporting block;

Figure 3 is a bottom plan view of the same;

Figure 4 is a detail fragmentary longitudinal sectional view of the wire clamp per se;

Figure 5 is a detail fragmentary side elevational view of a slightly modified form of wire clamp means; and Figure 6 is a detail fragmentary plan view of a lineman's stick for use in the present invention.

The device of the present invention includes pulley blocks 5 and 6, the former being of the three-sheave or pulley type and the latter being of the two-sheave or pulley type. The block 5 embodies a pair of plates 7 which extend completely through the blocks, the rear end thereof having a pulley wheel 8 detachably mounted therebetween, while the forward ends thereof merge into the forward terminals of metal straps 9 which are embedded in the block and extend in parallelism to the plates 7. The forward ends of the plates 7 and the forward ends of the straps 9 are formed integral, as illustrated in Figures 1 and 2, in order to provide a housing 10 which is adapted to receive one end of a wire clamp generally designated 11. The block 5 has three pulleys or sheaves 12 rotatably mounted therein over which a tackle or rope 13 is trained in a manner well-known in the art. The block 6 embodies a plate 14, the inner end of which terminates at the inner end of the block while the opposite end extends appreciably therebeyond and merges into a frame or housing 15. A pair of metal straps 16 extend from the frame 15 completely through the pulley block and at their rear ends provide a bearing for a pulley wheel 17 to which one end of the tackle 13 is anchored. Sheaves or pulleys 18 are rotatably mounted in the block 6 and have intermediate portions of the tackle 13 trained thereover in an apparent manner.

The clamp 11 is mounted upon the block 5 and by preference is rigidly secured thereto in order to prevent relative movement between the clamp and block. This is accomplished by embodying in the clamp 11 a bar 19, the free end 20 of which is of circular configuration in cross-section and extends through a complemental opening formed in the frame 10. The bar is held from displacement in the frame 10 by a pin 21. The outer end of the bar 19 is pivotally connected to one end of a cam 22, the latter being pivotally engaged with the clamp body 23. The clamp body 23 includes an arm 24 which terminates in a loop 25 through which the bar 19 is movably mounted. The top of the body overhangs the working face of the cam 22 to provide a space between said top and said cam in which the wire 26 to be stretched 26 is mounted. To prevent displacement of the wire from the clamp, a suitable latch member 27 is provided which closes over the mouth of the clamp and has a portion of its free end bent outwardly at right angles to provide a finger-engaging portion 28 to facilitate movement of the latch. One end of the latch is pivotally engaged with the cam 22 while the opposite end is frictionally engaged with the top of the clamp body. Rearward movement of the latch is limited by the inner wall of the recess. An abutment 30 extends from the top of the clamp body, it being adapted for engagement with the lineman's stick in order to release the clamp from the wire in a manner hereinafter set forth.

The block 6 is equipped with an anchoring hook 31 which, in the present instance, is adapted to be anchored on a line pole and has the shank 32 thereof extended for engagement in a complemental opening formed in the frame 15. The shank is held from displacement in the frame by a locking bolt or pin 33 which extends transversely through the shank. In this manner the hook is rigidly engaged with the block but may be detached when desired by simply removing the bolt or pin 33.

It is sometimes found desirable to stretch wire on both sides of a line pole, and with the device of the present invention the wire can be stretched on both sides by exerting a pull on the wire on each side of the post and after the slack has been removed from the wire a portion of the latter may be cut out and the ends of the wire spliced in the customary manner. To effect this result it is necessary to remove the hook 31 and to substitute therefor wire clamp means 11 which is associated with the frame or housing 15 in the same manner that the wire clamp 11 is engaged with the housing 10. The housings 10 and 15 have bores of the same diameter so that each may receive a wire clamp or an anchor hook as desired. When the wire clamp means is engaged in both housings 10 and 15, it is necessary that one of the clamps be engaged with the wire on one side of the pole and the other clamp engaged with the wire on the other side of the pole in which position the tackle will be caused to extend transversely across the cross arm of the pole. In order to hold the blocks in the desired proximity to the wire, suitable hooks 34 are provided, one being pivotally mounted on each of the blocks 5 and 6 and being adapted to swing upwardly and hook over the wire as illustrated in Figure 1. The clamps are engaged with the wire by urging the latter through the open side of each clamp after which the latch 27 is urged into a closed position to prevent lateral displacement of the wire. The lineman then engages his stick with the abutment 30 so as to hold the clamp in a fixed position on the wire while pressure is exerted upon the blocks, which correspondingly exerts pressure upon each of the bars 19 and causes the latter to actuate the cams into engagement with the line. Once the line has been gripped, the lineman may disengage his stick from the abutment and pressure can be exerted on the tackle in order to move the blocks 5 and 6 toward each other, until the slack has been removed from the wire, after which the clamps may be disengaged in an obvious manner.

Under some conditions it is possible to stretch the wire on one side of the pole without carrying the block and tackle into proximity to the line wire. Where conditions permit this course to be followed, it is preferable to use the form of wire clamp shown in Figure 5 of the drawings, which embodies a bar 19' and a cylindrical terminal 20'. The terminal 20' is provided with the usual opening 35 which in the form of invention shown in Figure 1 of the drawings, is adapted for the reception of the pin 21. In addition, the cylindrical terminal 20' is equipped with a line wire engaging hook 36 and a rope supporting link 37. In use of this form of the invention the clamp is engaged with the wire in the same manner as the clamp shown in Figure 1, but the block 5 is removed from the bar and the rope engaged with the link 37, so that pressure can be exerted on the bar 19' through the medium of the rope instead of exerting pressure upon the block 5. The rope which is engaged with the link 37 may consist of tackle 13 or may be a separate rope which is engaged with the tackle. In use of this form of invention, the blocks and tackle may be anchored in any convenient position on the ground in order to exert pressure upon the bar 19' to correspondingly exert a pull on the line wire or cable for drawing it taut. The opening 35 is adapted for the reception of a stud formed on the lineman's stick to actuate the bar 19'.

In Figure 6, a lineman's stick especially adapted for use in connection with the present invention is illustrated. The stick as illustrated consists of a head 38 which may be of any desired configuration and has a shank 39 issuing therefrom, the free end of which is provided with a screw-threaded recess 40 which is adapted for the reception of a complemental shank 41 formed on one end of a rod 42. The head 38 is provided with the opening 43 adapted to be engaged over the abutment 30 of the clamp for holding the latter in a stationary position or moving the same at the option of the user. The head 38 is also equipped with a stud 44 which is adapted for engagement in the opening 35 of the cylindrical terminal 20' when the form of invention illustrated in Figure 5 is used. Immaterial of how the device of the present invention is used, it is manifest that it will be unnecessary for the lineman to leave the pole. Moreover, by providing blocks and tackle which are adapted for the reception of wire clamping means or "come-alongs," as they are known in the art, it will be possible to effectively stretch the wire in a minimum period of time and by saving a great deal of labor without exposing the lineman to the dangers to which he has heretofore been exposed in taking the slack out of line wires.

It is, of course, to be understood that various changes may be made in this device, especially in the details of construction, proportion and arrangement of parts as come within the scope of the appended claims. It is important, however, that the wire clamp and block be held in parallel relation to the line wire and that the wire be secured from displacement in the clamp. It is moreover, important that the connection between the wire clamp and its block, and between the anchored hook and its block be rigid in order to eliminate any play.

What is claimed is:

1. A wire slack eliminating device including blocks and tackle equipped with an anchoring hook on one block and a rigid but detachable clamp on the other block, and means for securing the clamp to its block whereby relative movement between said clamp and block is eliminated.

2. A wire slack eliminator including blocks and tackle, an anchoring hook engaged with one of said blocks, a wire engaging clamp rigidly but detachably engaged with the other block, and a hook pivotally mounted on said wire clamp supporting block for engagement over the line wire to retain the block in longitudinal alignment with the clamp.

3. A wire slack eliminating device including blocks and tackle, an anchoring hook rigidly but detachably engaged with one of said blocks, a wire clamp rigidly but detachably engaged with the other of said blocks, means to retain the wire from displacement in said clamp, and means mounted on the block for engagement with the wire to retain the block in parallel relation to the wire.

4. A wire slack eliminating device including wire clamp means embodying wire gripping elements, one of which is movable and equipped with an operating bar, and means carried by the operating bar to facilitate movement of the latter.

5. A wire slack eliminating device including a block and tackle equipped with wire cable embracing means, said means comprising wire cable embracing elements, one of which is movable, a bar to control movement of said element, and an abutment on said means to facilitate movement of the bar.

6. Wire slack eliminating devices including blocks, each of which is equipped with a housing, a wire clamp detachably mounted in one of said housings and an anchoring hook detachably mounted in the other housing, and a tackle trained through said blocks to urge the latter together.

7. A wire slack eliminating device including blocks and tackle, wire clamp means carried by one of said blocks and projecting beyond the face of the latter to permit retention of the wire beyond the plane of the block, and means mounted upon said wire clamp means carrying block, to retain the wire in parallelism to the latter.

8. A wire slack eliminating device including blocks and tackle, a housing carried by each block, an anchoring hook detachably mounted in one of said housings, wire clamping means detachably mounted in the other housing having the wire engaging portion thereof extended beyond the block, and hooks carried by said blocks to pendently support the latter on the wire.

THOMAS F. DUFFEY.